US012581562B2

(12) United States Patent　　　(10) Patent No.:　US 12,581,562 B2
Wang　　　　　　　　　　　　　　(45) Date of Patent:　　Mar. 17, 2026

(54) METHODS, DEVICES, AND MEDIUM FOR COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 404 days.

(21) Appl. No.: 17/793,706

(22) PCT Filed: Jan. 22, 2020

(86) PCT No.: PCT/CN2020/073898
§ 371 (c)(1),
(2) Date: Jul. 19, 2022

(87) PCT Pub. No.: WO2021/147030
PCT Pub. Date: Jul. 29, 2021

(65) Prior Publication Data
US 2023/0069669 A1　　Mar. 2, 2023

(51) Int. Cl.
| *H04W 4/00* | (2018.01) |
| *H04W 48/20* | (2009.01) |
| *H04W 76/27* | (2018.01) |
| *H04W 72/21* | (2023.01) |
| *H04W 72/23* | (2023.01) |

(52) U.S. Cl.
CPC ........... *H04W 76/27* (2018.02); *H04W 48/20* (2013.01); *H04W 72/21* (2023.01); *H04W 72/23* (2023.01)

(58) Field of Classification Search
None
See application file for complete search history.

(56) References Cited

U.S. PATENT DOCUMENTS

| 2018/0227851 A1 | 8/2018 | Kubota et al. | |
| 2018/0368196 A1* | 12/2018 | Gage | ................... H04L 63/0428 |

(Continued)

FOREIGN PATENT DOCUMENTS

| CN | 110139386 A | 8/2019 |
| GB | 2560756 A | 9/2018 |
| WO | 2018/014661 A1 | 1/2018 |

OTHER PUBLICATIONS

Huawei, "Periodic RAN-based notification area update", 3GPP TSG-RAN WG3 NR AdHoc, R3-172388, Jun. 27-29, 2017, pp. 1-3, Qingdao, China.

(Continued)

*Primary Examiner* — Bob A Phunkulh
(74) *Attorney, Agent, or Firm* — Sughrue Mion, PLLC

(57)　　　　　　　　ABSTRACT

Embodiments of the present disclosure relate to methods, devices, and medium for communication. A method for communication comprises in accordance with a determination that a terminal device in an inactive state requests a first network device for a transmission of uplink data, determining whether to relocate an anchor for a context of the terminal device from a second network device to the first network device, the second network device maintaining the context of the terminal device. The method further comprises in accordance with a determination of non-relocation of the anchor for the context of the terminal device, causing the uplink data to be forwarded to a destination via a second network device based on the maintained context of the terminal device.

18 Claims, 7 Drawing Sheets

(56)                    References Cited

U.S. PATENT DOCUMENTS

| | | | | |
|---|---|---|---|---|
| 2019/0208500 | A1* | 7/2019 | Jia | H04W 76/27 |
| 2020/0022083 | A1* | 1/2020 | Jin | H04W 76/27 |
| 2020/0037210 | A1* | 1/2020 | Rugeland | H04W 36/0033 |
| 2020/0275512 | A1* | 8/2020 | Wu | H04W 76/20 |
| 2020/0314700 | A1* | 10/2020 | Da Silva | H04W 76/27 |
| 2020/0351723 | A1* | 11/2020 | Kim | H04W 36/0033 |
| 2020/0404570 | A1* | 12/2020 | Wang | H04W 8/08 |
| 2021/0160949 | A1* | 5/2021 | Kim | H04W 76/27 |
| 2021/0176692 | A1* | 6/2021 | Rugeland | H04W 76/19 |
| 2021/0211945 | A1* | 7/2021 | Rugeland | H04W 76/16 |
| 2021/0392714 | A1* | 12/2021 | Han | H04L 1/1896 |
| 2022/0007454 | A1* | 1/2022 | Han | H04W 12/106 |
| 2022/0039198 | A1* | 2/2022 | Liu | H04W 76/22 |
| 2022/0377665 | A1* | 11/2022 | Laselva | H04W 76/27 |

OTHER PUBLICATIONS

Huawei, "RAN-based notification area update", 3GPP TSG-RAN WG3 #97, R3-173083, Aug. 21-25, 2017, pp. 1-2, Berlin, Germany.

Nokia et al., "Way forward on periodic RNA Update", 3GPP TSG-RAN WG3#98, R3-174892, Nov. 27-Dec. 1, 2017, p. 1, Reno, USA.

Zte et al., "Consideration on context maintenance", 3GPP TSG-RAN WG2 #97, R2-1701928, Feb. 13-17, 2017, pp. 1-6, Athens, Greece.

International Search Report of PCT/CN2020/073898 dated Oct. 28, 2020 [PCT/ISA/210].

Written Opinion of PCT/CN2020/073898 dated Oct. 28, 2020 [PCT/ISA/237].

JP Office Action for JP Application No. 2022-544127, mailed on Aug. 29, 2023 with English Translation.

Nokia et al., "Inactive mode procedures in NR", 3GPP TSG-RAN WG2 NR #97 R2-1701066, Feb. 3, 2017, pp. 1-pp. 5.

Huawei, "UL data transmission without RRC signalling without initiating transition to active (option A)", 3GPP TSG-RAN NR Adhoc R2-1700185, Jan. 24, 2017, pp. 1-pp. 26.

Extended European Search Report dated Dec. 22, 2022, issued in European Application No. 20914875.8.

* cited by examiner

METHODS, DEVICES, AND MEDIUM FOR COMMUNICATION

CROSS REFERENCE TO RELATED APPLICATIONS

This application is a National Stage of International Application No. PCT/CN2020/073898, filed Jan. 22, 2020.

TECHNICAL FIELD

Embodiments of the present disclosure generally relate to the field of telecommunication, and in particular, to methods, devices, and medium for communication.

BACKGROUND

To meet the demand for wireless data traffic having increased since deployment of 4th generation (4G) communication systems, efforts have been made to develop an improved 5th generation (5G) or pre-5G communication system. The new communication systems can support various types of service applications for terminal devices.

In communication systems, a terminal device can transition between an inactive state and a connected state with a network device. Placing the terminal device in the inactive state can benefit from power consumption. Traditionally, data transmission is not supported in the inactive state. Hence, the terminal device has to establish or reestablish a connection with a network device for any downlink or uplink data. Connection setup and subsequently release to the inactive state happens for each data transmission no matter how small and infrequent the data packets are. This results in unnecessary power consumption and signalling overhead. For applications involving a small amount of data in each transmission, the overhead for establishing a connection between the terminal device and the network device is much higher relative to a small amount of data.

Signalling overhead from terminal devices in the inactive state for small data transmission (SDT) is a general problem and will become a critical issue as the number of terminal devices increases in a communication system, which may affect not only network performance and efficiency but also the battery performance of the terminal devices.

SUMMARY

In general, example embodiments of the present disclosure provide a solution of data transmission for a terminal device in an inactive state.

In a first aspect, there is provided a method for communication. The method comprises in accordance with a determination that a terminal device in an inactive state requests a first network device for a transmission of uplink data, determining whether to relocate an anchor for a context of the terminal device from a second network device to the first network device, the second network device maintaining the context of the terminal device; and in accordance with a determination of non-relocation of the anchor for the context of the terminal device, causing the uplink data to be forwarded to a destination via the second network device based on the maintained context of the terminal device.

In a second aspect, there is provided a method for communication. The method comprises determining, at a terminal device in an inactive state, whether a predetermined type of uplink transmission is triggered towards a first network device without a context of the terminal device or towards a second network device maintaining the context of the terminal device; in accordance with a determination that the predetermined type of uplink transmission is triggered towards the first network device, establishing a radio link control (RLC) entity for a RLC layer based on a default configuration for the RLC layer defined for the predetermined type of uplink transmission; and transmitting the uplink data to the first network device at least based on the entity for the RLC layer.

In a third aspect, there is provided a network device. The network device includes a processing unit; and a memory coupled to the processing unit and storing instructions thereon, the instructions, when executed by the processing unit, causing the device to perform the method according to the first aspect.

In a fourth aspect, there is provided a terminal device. The terminal device includes a processing unit; and a memory coupled to the processing unit and storing instructions thereon, the instructions, when executed by the processing unit, causing the device to perform the method according to the second aspect.

In a fifth aspect, there is provided a computer readable medium having instructions stored thereon, the instructions, when executed on at least one processor, causing the at least one processor to carry out the method according to the first aspect.

In an sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
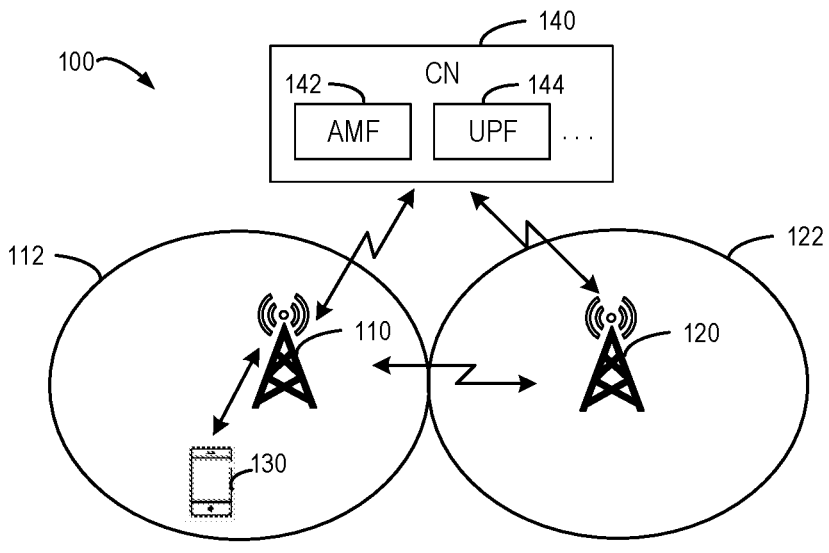
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) DEVICES, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Example Environment

FIG. 1 shows an example communication environment 100 in which example embodiments of the present disclosure can be implemented. In the example of FIG. 1, a plurality of network devices 110, 120 are deployed to serve a terminal device. The serving areas of the network devices 110, 120 are called as cells 112, 122. A terminal device may be located in a cell of a network device. FIG. 1 illustrates a terminal device 130 located within the cell 112 of the network device 110 and the terminal device may communicate with the network device 110. The network devices 110, 120 and possibly other network devices may form an access network.

Communications between the terminal device 130 and the network devices 110, 120 and between the network devices 110, 120 and the CN 140 may be implemented according to any proper communication protocol(s). Communication in a direction from a terminal device 130 towards a network device 110 or 120 is referred to as UL communication, while communication in a reverse direction from the network device 110 or 120 towards the terminal device 130 is referred to as DL communication. The terminal device 130 can move amongst the coverage areas of the network devices 110, 120 and possibly other network devices.

In UL communication, the terminal device 130 may transmit UL data and control information to the network device 110 or 120 via a UL channel. In some examples, the UL data may be transmitted in a physical uplink shared channel (PUSCH) and/or any other UL channels that are available used for data transmission. In some examples, the UL control information may be transmitted in a physical uplink control channel (PUCCH) and/or any other UL channels that are available for transmission of control information. In DL transmission, the network device 110 or 120 may transmit DL data and control information to the terminal device 130 via a DL channel. In some examples, the DL data may be transmitted in a physical downlink shared channel (PDSCH) and/or any other DL channels that are available used for data transmission. In some examples, the DL control information may be transmitted in a physical uplink control channel (PDCCH) and/or any other DL channels that are available for transmission of control information.

The network devices 110, 120 may connect to a core network (CN) 140. The core network 140 may comprise functional elements and/or network functions to support a variety of functions. The functional elements or network functions may depend on network types. For example, the CN 140 may include an access and mobility management function (AMF) 142 which may provide functions such as NAS ciphering and integrity protection, registration management, connection management, reachability management, mobility management, lawful intercept, transport for session management, and/or the like. The CN 140 may include an user plane function (UPF) 144 which may provide functions such as packet routing and forwarding, packet inspection and user plane part of policy rule enforcement, lawful intercept (UP collection), traffic usage reporting, uplink classifier to support routing traffic flows to a data network, quality of service (QoS) handling for user plane, uplink (UL) traffic verification, transport level packet marking in UL and DL, downlink (DL) packet buffering, DL data notification triggering, and/or the like. Although not shown, the CN 140 may comprise one or more other functional elements and/or network functions such as a session management function (SMF), a policy control function (PCF), a network exposure function (NEF), and/or the like. The scope of the embodiments of the present disclosure is not limited in this regard.

It is to be understood that the number of network devices and terminal devices in FIG. 1 is only for the purpose of illustration without suggesting any limitations. The environment 100 may include any suitable number of network devices and terminal devices adapted for implementing embodiments of the present disclosure. For example, one or more terminal devices may be located in the cells 112 and/or 122. The CN 140 may include more, less, or different functional elements and/or network functions.

3GPP Working Groups are working on a new feature called an inactive state. A terminal device can transition between an inactive state and a connected state. The inactive state may sometimes be referred to as an inactive mode, an RRC_INACTIVE state, an inactive state in a RRC_CONNECTED mode and such terms are used interchangeably herein. The connected state may sometimes be referred to as a connected mode, an RRC_CONNECTED state and such terms are used interchangeably herein.

In the inactive state, the terminal device does not have any dedicated resources (e.g., time and frequency resources) for transmission and/or reception. In the connected state, a connection is established between the terminal device and the network device and thus the terminal device can perform normal communication with the network device via the connection.

As mentioned above, there is a certain amount of signaling overhead and power consumption to transition the terminal device from an inactive state to a connected state by establishing or reestablishing a connection between the terminal device and the network device. Thus, if connection setup and subsequently release happens for each data transmission of the terminal device in the inactive state no matter how small and infrequent the data packets are, it may result in unnecessary power consumption and signalling overhead. Thus, allowing data transmission to and/or from a terminal device that is in inactive state makes sense if the terminal device has intermittent small data packets to transmit. It has been agreed to support small data transmission (SDT) for a terminal device in inactive state, without requiring the terminal device to establish a connection with a network device. As used herein, the term "SDT" refers to a type of transmission where a small amount of data is triggered, although other terms may also be used.

There are various applications that involve exchange of relatively small amounts of data. For example, in some applications of mobile devices, SDT may include traffic from Instant Messaging (IM) services, heart-beat or keep-alive traffic, for example, from IM or email clients and other services, push notifications in various applications, traffic from wearables (including, for example, periodic positioning information), and/or the like. In some applications of non-mobile devices, SDT may include sensor data (e.g., temperature, pressure readings transmitted periodically or in an event-triggered manner in an IoT network), metering and alerting information sent from smart meters, and/or the like.

However, currently there is no specific solution for data transmission for a terminal device in an inactive state. The inventors has found that one potential problem, among others, in data transmission, especially in UL data transmission in the inactive state is related to anchor relocation for a context of the terminal device. In the inactive state, a last serving network device keeps a context of the terminal device. If the terminal device moves to a coverage area of another network device and requests for data transmission, this new network device may not have a context of the terminal device to support the data transmission as no connection is established between the new network device and the terminal device in the inactive state.

Conventionally, the new network device can request the context of the terminal device from the last serving network device and initiate a path switch procedure to the CN to transmit the UL data to the UPF in the CN. However, such a procedure will require a certain amount of signaling exchanged between the two network devices and may introduce latency for the data transmission.

Work Principle and Example Method

According to example embodiments of the present disclosure, there is proposed a solution of data transmission for a terminal device in an inactive state. In this solution, in accordance with a determination that the terminal device in the inactive state requests for a transmission of UL data, a network device can determine whether or not to perform anchor relocation for a context of the terminal device. The network device may be the one to which the terminal device requests for a transmission of UL data or the one that currently maintains the context of the terminal device. If it is determined that the relocation for the context of the terminal device is not performed, UL data can be transmitted by the requested network device to the network device maintaining the context of the terminal device which can in turn forward the UL data to a destination based on the maintained context. In this way, either the requested network device or the network device maintaining the context can make the decision on whether or not to perform the anchor relocation depending on various actual requirements.

Figure 2:
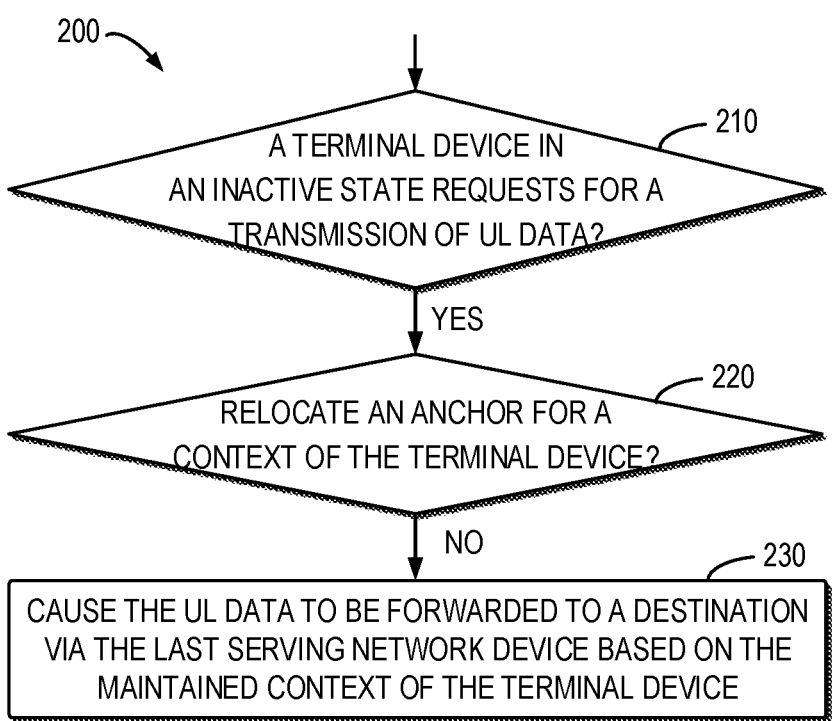
FIG. 2 is a flowchart of an example method of data transmission in accordance with some embodiments of the present disclosure.

Some example embodiments of the present disclosure will be described in detail below. Reference is first made to FIG. 2, which illustrates a flowchart of an example method 200 of data transmission for a terminal device 130 in an inactive state in accordance with some embodiments of the present disclosure. For the purpose of discussion, the method 200 will be described with reference to FIG. 1.

In the example embodiments of the present disclosure, the method 200, which involves making a decision on whether or not to perform anchor relocation, can be performed either by a network device to which the terminal device requests for data transmission or a network device that currently maintains a context of the terminal device. For a terminal device in an inactive state, the network device that maintains a context of the terminal device is generally a last serving network device of the terminal device when the terminal device was in the connected state. When the terminal device transitioned from the connected state to an inactive state, the last serving network device still maintains the context of the terminal device. On the other hand, the terminal device in the inactive state may move to a new location and requests another network device for a data transmission. Such other network device may be a new network device (relative to the last serving network device).

In the example of FIG. 1, it is assumed that the network device 110 is a new network device 110 for the terminal device 130, and the network device 120 is a last serving network device 120 for the terminal device 130. For purpose of discussion herein, the new network device 110 may sometimes be referred to as a first network device, and the last serving network device 120 may sometimes be referred to as a second network device.

At block 210, a network device (either the new network device 110 or the last serving network device 120) determines whether the terminal device 130 in the inactive state requests the network device 110 for a transmission of UL data. The new network device 110 may directly receive the request from the terminal device 130 and further receive the UL data from the terminal device 130. As such, the new network device 110 itself may determine the request for the transmission of the UL data. In some embodiments where the method 200 is performed by the last serving network device 120, the new network device 110 may inform the last serving network device 120 of the request for the transmission of the UL data.

In some embodiments, the transmission of the UL data from the terminal device 130 to the new network device 110 may be based on a random access (RA) procedure. The terminal device 130 may initiate a RA procedure to the new network device 110. Any type of RA procedure may be initiated, including a four-step RA procedure, a two-step RA procedure, and/or the like. In the four-step RA procedure, the terminal device 130 transmits a RA preamble in a first message (represented as "MSG1") to the new network device 110 via a physical random access channel (PRACH), and the new network device 110 then transmits a RA response (RAR, which may be referred to as "MSG2") to the RA preamble. Upon receipt of the RA response, the terminal device 130 transmits a message (which may be referred to as "MSG3") scheduled by the RAR to the new network device 110, and the UL data may be comprised in MSG3. In the two-step RA procedure, the terminal device 130 transmits both a RA preamble and the UL data to the new network device 110 in one message (represented as "MSGA" sometimes) where the preamble RA may be transmitted in PRACH and the UL data may be transmitted in PUSCH. In other types of RA procedure, the UL data may also be transmitted to the new network device 110 in other messages.

If it is determined that the terminal device 130 in the inactive state requests the new network device 110 for a transmission of UL data, at block 220, the network device (either the new network device 110 or the last serving network device 120) determines whether to relocate an anchor for a context of the terminal device 130 from the last serving network device 120 to the new network device 110. The last serving network device 120 maintains the context of the terminal device 130 and is considered as an anchor (or an anchor network device) for the context of the terminal device 130. As used herein, the term "anchor" generally refers to a network device (e.g., an eNB/gNB) that an inactive terminal device has previously connected with and that has the context of the terminal device for subsequent communication. The new network device 110 has no context of the terminal device 130. As used herein, the context of the terminal device 130 may include various parameters and configuration information that are required for communication with the terminal device 130.

The network device (either the new network device 110 or the last serving network device 120) may determine whether or not to relocate the anchor for the context of the terminal device 130 based on one or more of various factors. Such factors may include one or more aspects of the UL data, the terminal device 130, and/or the current condition of the last serving network device 120 or the new network device 110. In some embodiments, the network device 110 or 120 may make the decision based on one or more of a payload size of the UL data, a latency requirement for the transmission of the UL data, and/or the like. For example, the network device 110 or 120 may decide not to perform the anchor relocation in accordance with a determination that the payload size is relatively small (for example, being below a payload threshold) and/or in accordance with a determination that the transmission of the UL data is latency sensitive). In some example embodiments, to assist the network in making a decision, the terminal device 130 may transmit a buffer status report (BSR) together with the UL data to the new network device 110.

Alternatively, or in addition, the network device 110 or 120 may make the decision based on the number of UL transmission from the terminal device 130 (or specifically, the number of SDTs from the terminal device 130). If the terminal device 130 requests for UL transmission frequently (the number of UL transmission being higher than a threshold number), the network device 110 or 120 may decide that relocating the context of the terminal device 130 to the new network device 110 may facilitate continuous supports of data transmission to and/or from the terminal device 130 by the new network device 110.

In some embodiments, the workloads at the new network device 110 and/or the last serving network device 120 may also be taken into account when making the decision about the anchor relocation and non-relocation. It would be appreciated that the factors affecting the decision are provided for purpose of illustration only and one or more other factors may also be considered.

If it is determined that the anchor for the context of the terminal device 130 is not to be relocated (a non-relocation of the anchor or anchor non-relocation scenario), at block 230, the network device (either the new network device 110 or the last serving network device 120) causes the UL data to be forwarded to a destination via the last serving network device 120 based on the context of the terminal device 130 maintained at the last serving network device 120. The UL data may be transferred between the network devices, i.e., from the new network device 110 to the last serving network device 120. The last serving network device 120 may then forward the UL data using the context of the terminal device 130. In this case, the signaling overhead for anchor relocation is saved and the latency of transmission of UL data is decreased.

The destination of the UL data from the terminal device 130 may be in the CN 140. In some embodiments, the UL data may be transmitted to the UPF 144 in the CN 140. The UL data may be further processed in the CN 140. The scope of the embodiments of the present disclosure is not limited in the destination of the UL data.

In some embodiments, if it is determined to relocate the anchor for the context of the terminal device 130 to the new network device 110 (a relocation of the anchor or anchor relocation scenario), anchor relocation may be performed between the network devices 110, 120, and the CN 140. In some embodiments, in the method 200, the transmission of the UL data may be a type of SDT, which means that the size of the UL data may be relatively low. The new network device 110 or the last serving network device 120 may perform the method 200 in the case where the terminal device 130 triggers a type of SDT.

Example Processes without Anchor Relocation and with Anchor Relocation

As discussed above, either the new network device 110 or the last serving network device 120 can make a decision about anchor relocation and non-relocation for the context of the terminal device 130 in the inactive state. The signaling among those devices may be different in the two cases. Some example embodiments will be further described in details.

Figure 3A:
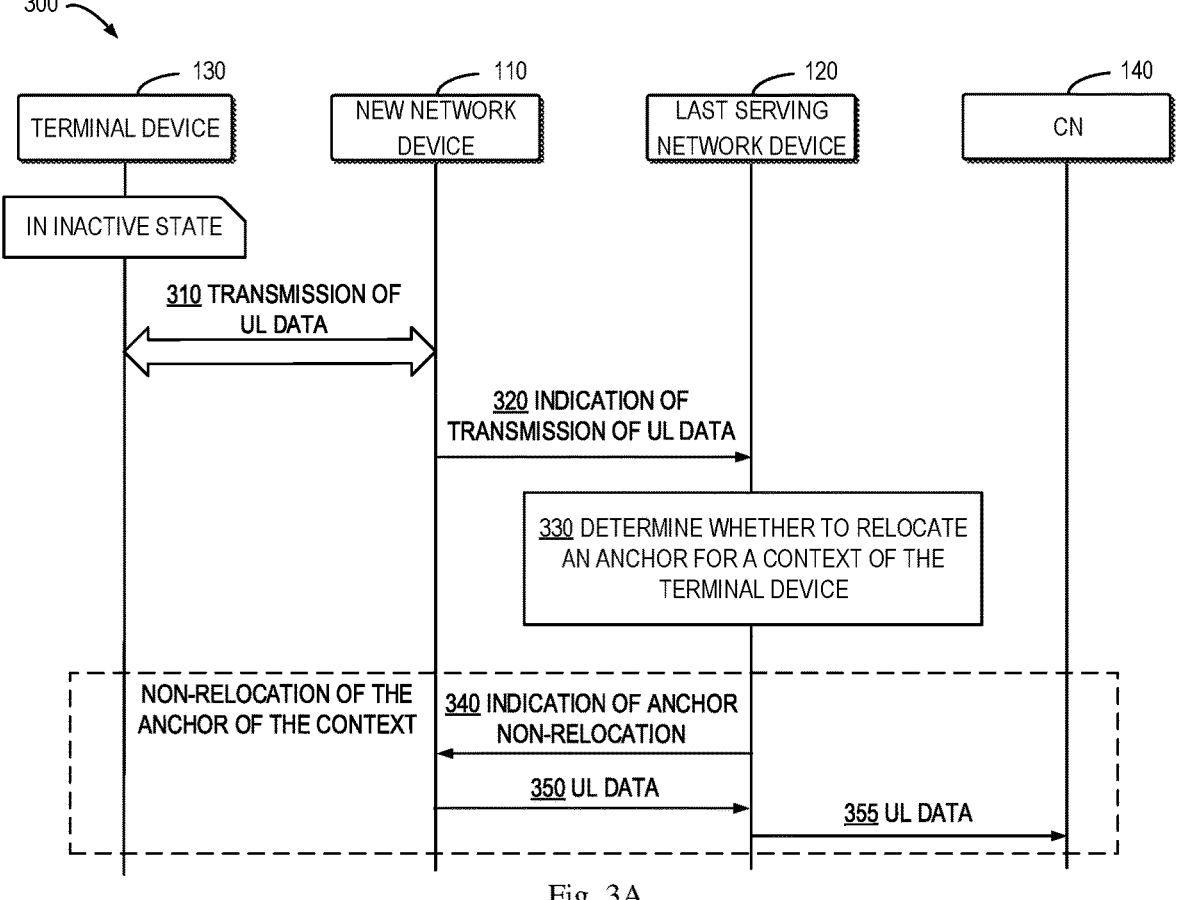
FIGS. 3A-3B are signaling charts illustrating processes of uplink transmission without relocation of an anchor for a context of a terminal device according to some embodiments of the present disclosure.
Figure 3B:
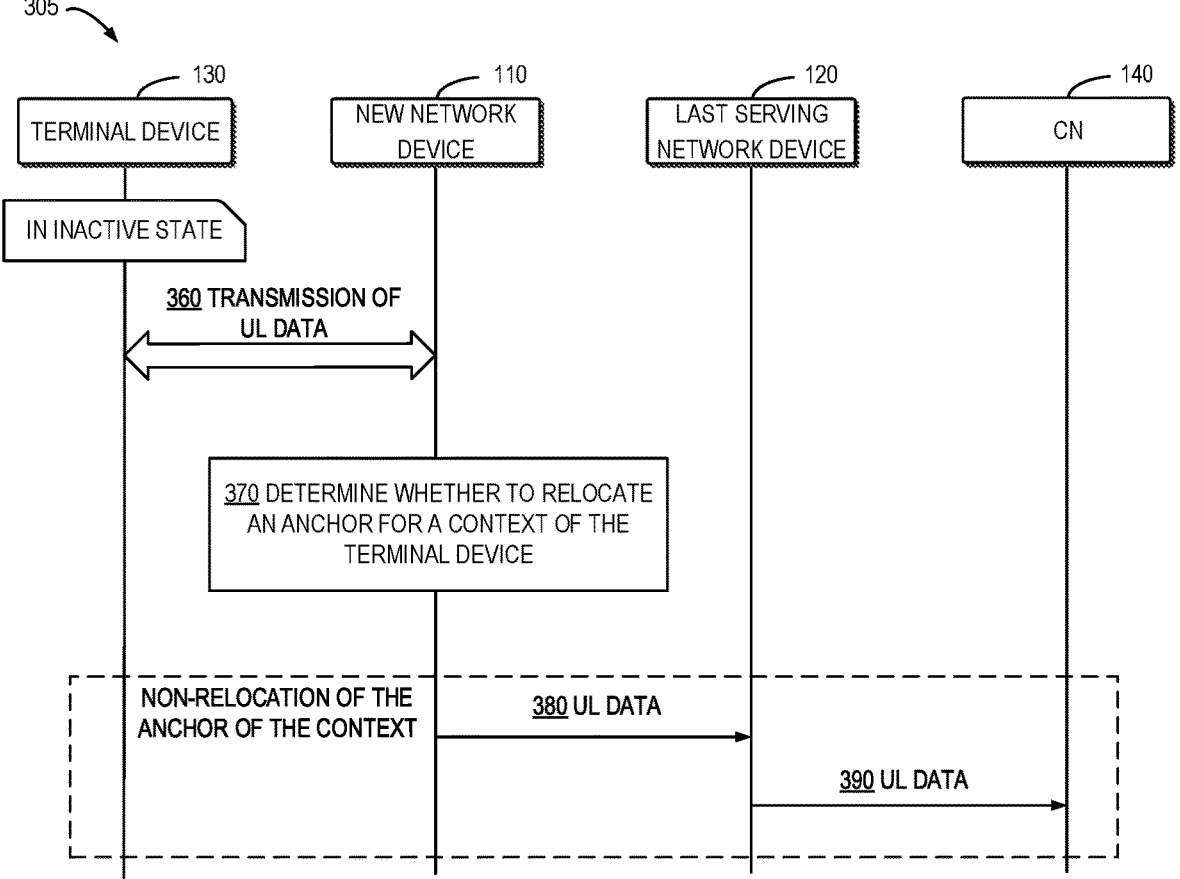

FIG. 3A and FIG. 3B are signaling charts illustrating processes 300 and 305 of UL transmission without anchor relocation according to some embodiments of the present disclosure. For the purpose of discussion, the processes 300 and 305 will be described with reference to FIG. 1. The processes 300 and 305 may involve the terminal device 130, the network device 110, the network device 120, and the CN 140 in FIG. 1. In the process 300 of FIG. 3A, it is the last serving network device 120 to decide whether or not to perform anchor relocation for the context of the terminal device 130. In the process 305 of FIG. 3B, it is the new network device 110 to decide whether or not to perform the anchor relocation.

The process 300 of FIG. 3A is first discussed. In operation, the terminal device 130 is in an inactive state. If the terminal device 130 has UL data to be transmitted to a certain destination, it attempts to request a network device for a transmission of the UL data. As the terminal device 130 is within a coverage area of the new network device 110, the terminal device 130 requests 310 the network device 110 for a transmission of UL data. The new network device 110 receives the request and further receives the UL data from the terminal device 130. As mentioned above, in some embodiments, the transmission of UL data from the terminal device 130 to the new network device 110 may be based on a RA procedure.

If the new network device 110 receives the UL data from the terminal device 130, the new network device 110 transmits 320, to the last serving network device 120, an indication (referred to as a "first indication" sometimes herein) that the terminal device 130, which is in an inactive state, requests for a transmission of UL data. In some example embodiments, the network device 110 may transmit a context request to the last serving network device 120, to request for a context of the terminal device 130. The context request may be a RETRIEVE UE CONTEXT REQUEST message. In an embodiment, the context request may include a resume cause indicating the type of the UL data transmission (e.g., a type of SDT). Alternatively, or in addition, the context request may include information on a payload size of the UL data.

Upon reception of the indication that the terminal device 130 requests for a transmission of UL data, the last serving network device 120 determines 330 whether to relocate an anchor for a context of the terminal device 130 from the last serving network device 120 to the new network device 110. The last serving network device 120 may determine whether anchor relocation is performed or not based on one or more of various factors, as discussed above.

If it is determined that the anchor for the context of the terminal device 130 is not to be relocated, the last serving network device 120 transmits 340 an indication of anchor non-relocation to the new network device 110. In some embodiments, the indication of anchor non-relocation may be indicated in a response to the context request sent by the new network device 110. For example, the indication of anchor non-relocation may be a RETRIEVE UE CONTEXT FAILURE message indicating a failure of requesting the context of the terminal device 130.

The new network device 110 then transmits 350 the UL data of the terminal device 130 to the last serving network device 120. The UL data may be transmitted using either a user plane interface (e.g., an Xn-U interface) or a control plane interface (e.g., an Xn-C interface) between the new network device 110 and the last serving network device 120. In the embodiments of using the user plane interface, the new network device 110 may need a data forwarding address of the last serving network device 120. The last serving network device 120 may transmit information on its data forwarding address to the new network device 110, for example, together with the indication of anchor non-relocation in the RETRIEVE UE CONTEXT FAILURE message. Of course, the information on the data forwarding address may be transmitted in a separate message to the new network device 110. The transmission of the data forwarding address as well as the indication of non-relocation anchor may be via the control plane interface between new network device 110 and the last serving network device 120. The new network device 110 may transmit the UL data of the terminal device 130 to the last serving network device 120 via the user plane interface based on the data forwarding address provided.

In the embodiments of using the control plane interface to transmit the UL data, the new network device 110 may encapsulate the UL data into a control message and then transmit the control message to the last serving network device 120 via the control plane interface. For example, the UL data may be included in a container carried in the control message (e.g., an Xn-C message). In some embodiments, the control message may further include an authentication code, for example, an integrity message authentication code (MAC-I) (such as resumeMAC-I), for the last serving network device 120 to perform authentication of the terminal device 130.

With the UL data received (either via the user plane interface or the control plane interface), the last serving network device 120 transmits 355 the UL data to the destination of the UL data based on the context of the terminal device 130 maintained. In some embodiments, the destination of the UL data may be the CN 140. The last serving network device 120 may transmit the UL data to the UPF 144 in the CN 140.

Reference turns to the process 305 of FIG. 3B where the new network device 110 decides whether or not to perform the anchor relocation. In operation, the terminal device 130 is in an inactive state. The terminal device 130 requests 360 the network device 110 for a transmission of UL data. The new network device 110 receives the request and further receives the UL data. The transmission of UL data from the terminal device 130 to the new network device 110 is similar as in the process 300.

Upon reception of the UL data from the terminal device 130 in the inactive state, as the new network device 110 has no context of the terminal device 130, it determines 370 whether to relocate an anchor for a context of the terminal device 130 from the last serving network device 120 to the new network device 110. The new network device 110 may determine whether anchor relocation is performed or not based on one or more of various factors, as discussed above.

If it is determined that the anchor for the context of the terminal device 130 is not to be relocated, the new network device 110 transmits 380 the UL data of the terminal device 130 to the last serving network device 120. The UL data may be transmitted using either a user plane interface (e.g., an Xn-U interface) or a control plane interface (e.g., an Xn-C interface) between the new network device 110 and the last serving network device 120.

In the embodiments of using the user plane interface for UL data transmission, the new network device 110 may need a data forwarding address of the last serving network device 120. The new network device 110 may request the last serving network device 120 for the data forwarding address. The last serving network device 120 may transmit a response to the request, including the data forwarding address. The request and the response may be transmitted via the control plane interface. As an example, the new network device 110 may transmit, via the Xn-C interface, an Xn-U ADDRESS REQUEST message to the last serving network device 120 to request for the data forwarding address for communication. The last serving network device 120 may respond with the data forwarding address in the Xn-U ADDRESS INDICATION message. Of course, the information on the forwarding address may be transmitted in any other message to the new network device 110. The new network device 110 may then transmit the UL data of the terminal device 130 to the last serving network device 120 via the user plane interface based on the data forwarding address provided.

In the embodiments of using the control plane interface to transmit the UL data, the new network device 110 may not need to request for the data forwarding address. The new network device 110 may encapsulate the UL data into a control message and then transmit the control message to the last serving network device 120 via the control plane interface. For example, the UL data may be included in a container carried in the control message (e.g., an Xn-C message). In some embodiments, the control message may further include an authentication code, for example, an integrity message authentication code (MAC-I) (such as resumeMAC-I), for the last serving network device 120 to perform authentication of the terminal device 130.

With the UL data received (either via the user plane interface or the control plane interface), the last serving network device 120 transmits 390 the UL data to the destination of the UL data based on the context of the terminal device 130 maintained. In some embodiments, the destination of the UL data may be the CN 140. The last serving network device 120 may transmit the UL data to the UPF 144 in the CN 140.

Figure 4:
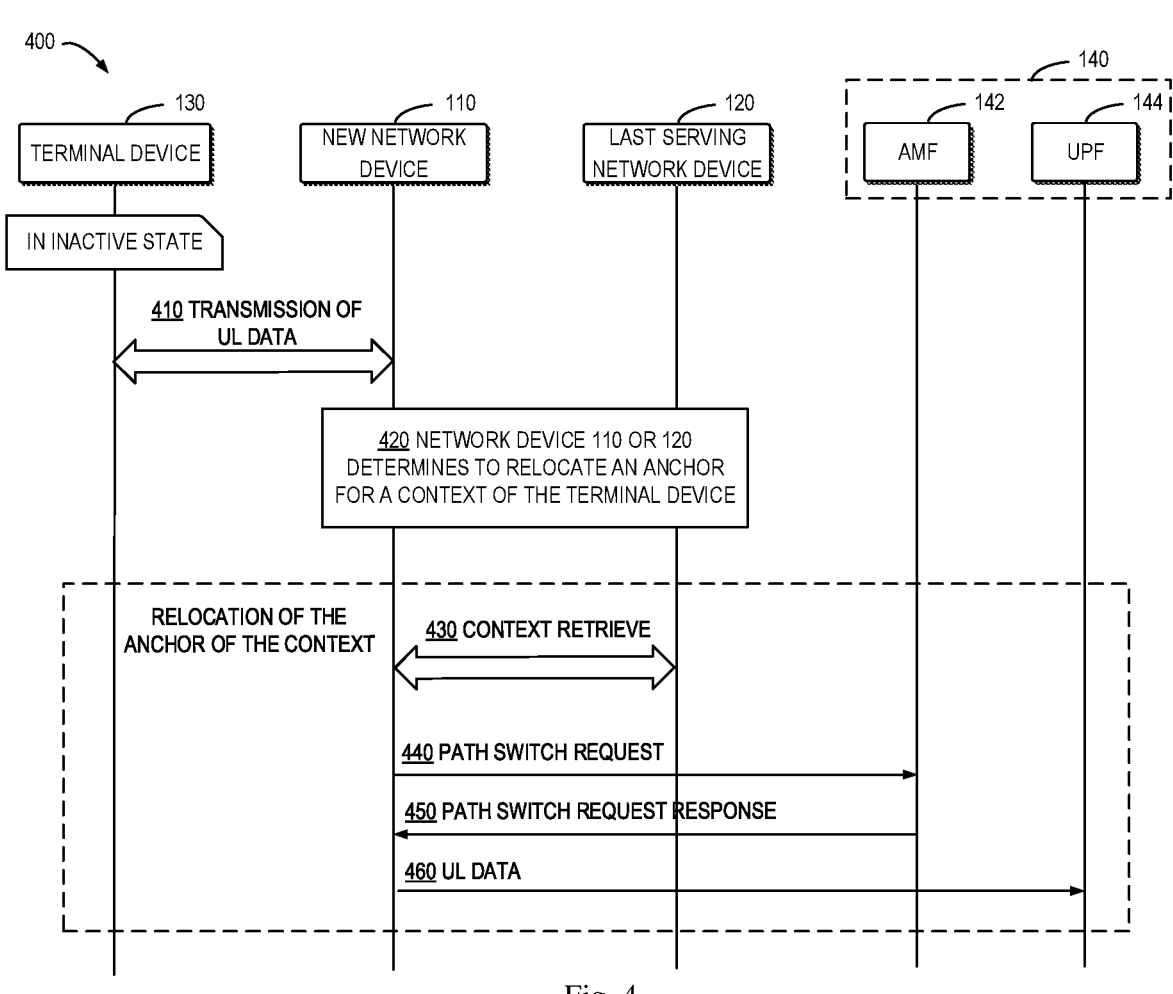
FIG. 4 is a signaling chart illustrating a processes of uplink transmission with relocation of an anchor for a context of a terminal device according to some embodiments of the present disclosure.

The embodiments for the anchor non-relocation scenario have been described above. FIG. 4 is a signaling chart illustrating a process 400 of UL transmission with anchor relocation according to some embodiments of the present disclosure. For the purpose of discussion, the process 400 will be described with reference to FIG. 1. In the process 400, the decision on whether or not to perform anchor relocation can be performed either by the last serving network device 120 or the new network device 110.

In operation, the terminal device 130 is in an inactive state. The terminal device 130 requests 410 the network device 110 for a transmission of UL data. The new network device 110 receives the request and further receives the UL data. The transmission of UL data from the terminal device 130 to the new network device 110 is similar as in the process 300.

The new network device 110 or the last serving network device 120 decides whether or not to relocate an anchor for a context of the terminal device 130 and determines 420 to relocate the anchor. The new network device 110 retrieves 430 a context of the terminal device 130 from the last serving network device 120. In some cases where the new network device 110 makes the decision about anchor relocation and non-relocation, the new network device 110 may transmit a context request to the last serving network device 120 to request for a context of the terminal device 130. The context request may be a RETRIEVE UE CONTEXT REQUEST message. In an embodiment, the context request may include a resume cause indicating the type of the UL data transmission (e.g., SDT). Alternatively, or in addition, the context request may include information on a payload size of the UL data. With the resume cause of SDT or the payload size of the UL data, the last serving network device 120 may make its decision on whether or not to provide the context of the terminal device 130 for SDT. The last serving network device may transmit the maintained context of the terminal device 130 to the new network device 11, for example, in a RETRIEVE UE CONTEXT RESPONSE message. In some cases where the last serving network device 120 makes the decision about anchor relocation and non-relocation, the new network device 110 may have transmitted the context request to the last serving network device 120 before the decision of performing anchor relocation is made and thus the last serving network device 120 may provide the maintained context of the terminal device 130 as a response to the context request, for example, in a RETRIEVE UE CONTEXT RESPONSE message.

The new network device 110 may then imitate a path switch procedure with the CN 140. Specifically, the new network device 110 transmits 440 a PATH SWITCH REQUEST message to the AMF 142, and the AMF 142 responds 450 with a PATH SWITH REQUEST RESPONSE message to the new network device 110. After the path switch is completed, the context of the terminal device 130 is transferred to the new network device 110. The new network device 110 can directly transmit 460, based on the context, the UL data of the terminal device 130 to its destination, for example, the UPF 144 in the CN 140.

Example Processes of Data Forwarding

No matter which network device makes a decision of anchor non-relocation for the context of the terminal device 130, the UL data of the terminal device 130 is transmitted from the new network device 110 to the last serving network device 120 and then to the UPF 144 without performing the anchor relocation. In such case, with the context of the terminal device 130 unknown at the side of the new network device 110, entities for respective network protocol layers may be configured to support communication of the UL data.

Generally speaking, for a communication device (such as a terminal device or a network device), there are a plurality of entities for a plurality of network protocol layers in a stack structure, which can be configured to implement corresponding processing on data transmitted from the communication device and received by the communication device. To support UL and DL communication of a certain terminal device, the configurations for the entities can be determined based on the context of the terminal device.

The entities for the network protocol layers may include an entity for the L1 layer, i.e., an entity for a physical (PHY) layer (also referred to as a PHY entity), one or more entities for upper layers (L2 and L3 layers) including an entity for a media access control (MAC) layer (also referred to as a MAC entity), an entity for a radio link control (RLC) layer (also referred to as a RLC entity), an entity for a packet data convergence protocol (PDCP) layer (also referred to as a PDCP layer), and an entity for a service data application protocol (SDAP) layer (also referred to as a SDAP layer, which is established in 5G and higher-generation networks). In some cases, the PHY, MAC, RLC, PDCP, SDAP entities are in a stack structure.

In some embodiments, without the context of the terminal device 130 transferred, to support the transmission of the UL data, the new network device 110 may establish an entity for a network protocol layer (sometimes referred to as herein a "first entity for a first network protocol layer") based on a default configuration for this network protocol layer. The default configuration is not related to the specific context of the terminal device 130. Generally, some lower network protocol layers may have default configurations applicable. Using the default configurations to establish the entities of the lower network protocol layers may not affect significantly the communication performance.

Figure 5:
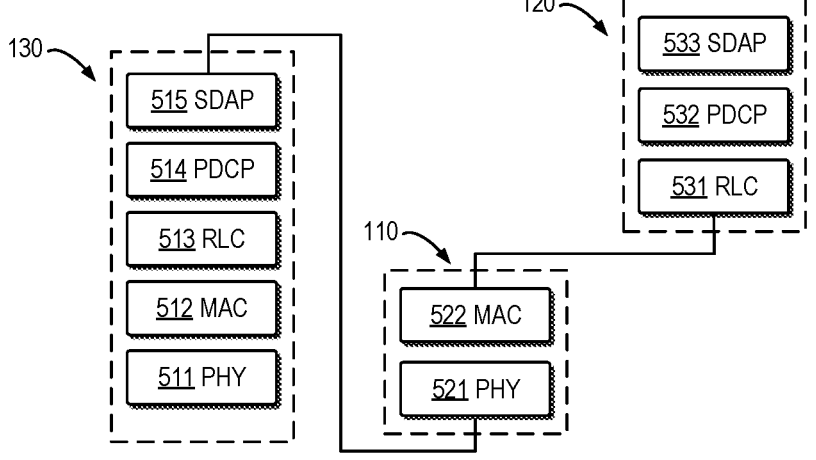
FIG. 5 is a block diagram of network protocol layer entities established at devices according to some embodiments of the present disclosure.

In some embodiments, the new network device 110 may establish a PHY entity and a MAC entity based on corresponding configurations for the PHY layer and the MAC layer. The entities at the terminal device 130 and the last serving network device 120 may be established and configured to enable communication with the new network device 110. FIG. 5 illustrates a block diagram of network protocol layer entities established at the devices according to some embodiments where the new network device 110 establishes entities for network protocol layers based on default configurations.

As shown in FIG. 5, the new network device 110 establish a PHY entity 521 and a MAC entity 522 based on default configurations for the PHY layer and the MAC layer, respectively, for communication of the terminal device 130's UL data. The default configuration for the PHY layer may be, for example, L1 layer configuration, and the default configuration for the MAC layer may be, for example, MAC Cell Group configuration. The new network device 110 may not establish an entity for a network protocol layer higher than the MAC layer, such as the RLC entity, PDCP entity, and SDAP entity. Thus, the UL data to be transmitted from the new network device 110 is packaged in a RLC protocol data unit (PDU).

At the side of the last serving network device 120, to receive and process the RLC PDU from the new network device 110, it may establish an entity for a network protocol layer higher than the highest network protocol layer with the entity established at the new network device 110 although it is able to establish all the entities for all the network protocol layer based on the maintained context of the terminal device 130. The last serving network device 120 may not establish an entity for a network protocol layer lower than the RLC layer, such as the MAC entity and the PHY entity.

In the example of FIG. 5, the last serving network device 120 establishes an RLC entity 531 and one or more entities for network protocol layers higher than the RLC layer, such as a PDCP entity 532 and possibly a SDAP entity 533 based on the maintained context of the terminal device 130. In the case of anchor non-relocation, the new network device 110 may use the PHY entity 521 and the MAC entity 522 to support transmission of UL data of the terminal device 130 to the last serving network device 120. A RLC PDU containing the UL data may be transmitted to the last serving network device 120. The last serving network device 120 may process the received RLC PDU using the established RLC entity 531, PDCP entity 532, and SDAP entity 533, and finally transmit the UL data out from the last serving network device 120 to the destination (e.g., the UPF 144 in the CN 140).

In some embodiments, since the RLC PDU containing the UL data is transmitted from the new network device 110 to the last serving network device 120, the data forwarding address of the last serving network device 120 may be per logical channel (LCH) between the last serving network device 120 and the new network device 110. The new network device 110 may then transmit the RLC PDU containing the UL data to the last serving network device 120 based on the data forwarding address per LCH. In some embodiments, the information on the data forwarding address provided by the last serving network device 120 may contain a list of LCH identities (LCH IDs) to indicate a list of LCHs for data forwarding. An example information element (IE) for the information on the data forwarding address may be provided in the following Table 1, where "M" represents mandatory, "O" represents optional, and "UP TNL" represents a user plane transport network layer.

TABLE 1

| IE for information on a data forwarding address | | | | |
|---|---|---|---|---|
| IE/Group Name | Presence | Range | IE type and reference | Semantics description |
| Data Forwarding logical channel List | | 0 . . . 1 | | |
| >Data Forwarding logical channel Item | | 1 . . . <maxnoofLCs> | | |
| >>LCID | M | | x.x.x.x | |

TABLE 1-continued

| IE for information on a data forwarding address | | | | |
|---|---|---|---|---|
| IE/Group Name | Presence | Range | IE type and reference | Semantics description |
| >>DL Forwarding UP TNL Information | O | | UP Transport Layer Information 9.2.3.30 | |
| >>UL Forwarding UP TNL Information | O | | UP Transport Layer Information 9.2.3.30 | |

At the side of the terminal device 130, to enable processing of UL data by the PHY entity 521 and the MAC entity 522 that are established based on the corresponding default configurations, the terminal device 130 may establish its PHY entity 511 and MAC entity 512 based on the same default configurations for the PHY layer and MAC layer. The terminal device 130 may establish entities for network protocol layers higher than the MAC layer based on its context maintained locally (for example, access stratum (AS) context). Specifically, the terminal device 130 may establish a RLC entity 513, a PDCP entity 514 and possibly a SDAP entity 515 based on its stored context.

In some embodiments, the terminal device 130 may determine whether the triggered transmission of the UL data is a certain type of UL transmission, such as a type of SDT. If it is the certain type of UL transmission and the decision of anchor non-relocation is potentially made in response to this type of UL transmission, then the terminal device 130 may establish the PHY entity 511 and the MAC entity 512 based on the default configurations.

Figure 6:
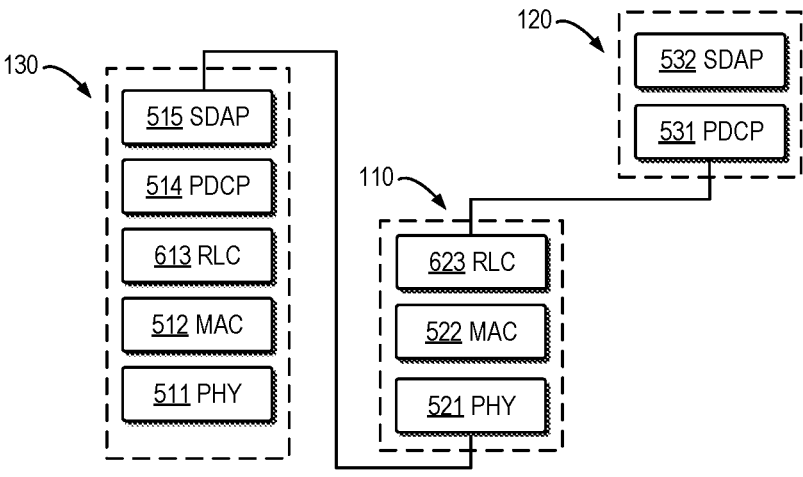
FIG. 6 is a block diagram of network protocol layer entities established at devices according to some other embodiments of the present disclosure.

In some embodiments, it is expected that the new network device 110 can establish an entity for a higher network protocol layer than the MAC layer, such as a RLC entity when the anchor non-relocation happens. In an embodiment, a default configuration for the RLC layer may be predefined, which may be used in case of SDT. The new network device 110 may then establish a RLC entity for the RLC layer based on the default configuration defined for SDT of the terminal device. FIG. 6 illustrates a block diagram of network protocol layer entities established at the devices in such embodiments.

As compared with the network protocol layer entities established in the example of FIG. 6, the difference is that the new network device 110 may further establish a RLC entity 623 for a RLC layer in the anchor non-relocation scenario. In an example, the RLC entity 623 is established in accordance with a determination that the UL data of the terminal device 130 is of a predetermined type of UL transmission, such as a type of SDT. In other examples, the new network device 110 may establish the RLC entity 623 when it or the last serving network device 120 decides not to perform anchor relocation for the context of the terminal device 130. The new network device 110 may receive transmit a PDCP PDU containing the UL data to the last serving network device 120 based on the established RLC entity 623 as well as the MAC entity 522 and the PHY entity 521.

At the side of the last serving network device 120, to receive and process the PDCP PDU from the new network device 110, it may not need to establish other entities for lower network protocol layers than the PDCP layer. As shown in FIG. 6, the last serving network device 120 may establish the PDCP entity 532 and the SDAP entity 533 based on the maintained context of the terminal device 130. The last serving network device 120 may receive the PDCP PDU from the new network device 110, and process the PDCP PDU using the PDCP entity 532 and the SDAP entity 533.

In some embodiments, since the PDCP PDU containing the UL data is transmitted from the new network device 110 to the last serving network device 120, the data forwarding address of the last serving network device 120 may be per data resource bearer (DRB) between the last serving network device 120 and the new network device 110. The new network device 110 may then transmit the PDCP PDU containing the UL data to the last serving network device 120 based on the data forwarding address per DRB.

At the side of the terminal device 130, to enable processing of UL data by the PHY entity 521, the MAC entity 522, and the RLC entity 623 that are established based on the corresponding default configurations, the terminal device 130 may establish its PHY entity 511 and MAC entity 512 based on the default configurations for the PHY layer and MAC layer, and establish a RLC entity 613 based on a default configuration defined for SDT of the terminal device 130. The terminal device 130 may further establish entities for network protocol layers higher than the RLC layer based on its context maintained locally. Specifically, the terminal device 130 may establish a PDCP entity 514 and possibly a SDAP entity 515 based on its stored context, as in the example of FIG. 5.

Figure 7:
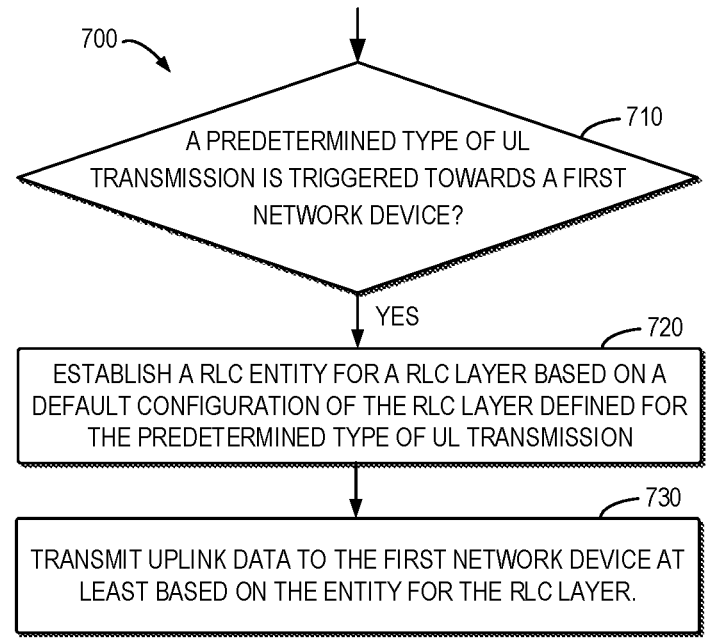
FIG. 7 is a flowchart of an example method in accordance with some other embodiments of the present disclosure.

In some embodiments, the terminal device 130 may decide whether to establish the RLC entity 623 based on the default configuration or the context of the terminal device 130. FIG. 7 illustrates a flowchart of a method 700 implemented at the terminal device 130 according to some embodiments of the present disclosure.

At block 710, the terminal device 130 in an inactive state determines whether a predetermined type of UL transmission is triggered towards a first network device without a context of the terminal device (i.e., the new network device 110) or towards a second network device maintaining the context of the terminal device (i.e., the last serving network device 120). The predetermined type of UL transmission may be, for example, a type of SDT where the amount of UL data to be transmitted is relatively small.

If the terminal device 130 determines that the predetermined type of UL transmission is triggered towards the first network device (i.e., the new network device 110), at block 720, the terminal device 130 establishes a RLC entity for a RLC layer based on a default configuration for the RLC layer defined for the predetermined type of UL transmission. At block 730, the terminal device 130 transmits the UL data to the first network device (i.e., the new network device 110)

at least based on the entity for the RLC layer (for example, the RLC entity 613) as well as other entities (such as the PHY entity 511, MAC entity 512, PDCP entity 514, and SDAP entity 515 in the example of FIG. 6).

In some embodiments, the PDU (either in the RLC PDU or the PDCP PDU) containing the UL data transmitted from the new network device 110 to the last serving network device 120 may be transmitted via a control plane interface (e.g., an Xn-C interface) as discussed above. The UL data may be contained in the container when transmitted via the control plane interface. The container may contain a PDCP PDU for the user plane (referred to as a PDCP-U PDU) or a RLC PDU for the user plane (referred to as a RLC-U PDU). An example IE for UL data carried in a control message via the control plane interface may be provided in the following Table 2.

TABLE 2

| IE for UL data carried in a control message | | | | | | |
|---|---|---|---|---|---|---|
| IE/Group Name | Presence | Range | IE type and reference | Semantics description | IE/Group Name | Presence |
| SDT | | 0 . . . 1 | | | YES | reject |
| >SDT Container | O | | OCTET STRING | Contains a PDCP-U PDU or RLC-U PDU encapsulating an SDT container | — | |
| >DRB ID or LCID | M | | INTEGER (0 . . . maximumDR Bnum or maximunLCID) | The DRB ID or LCID for the UL data | — | |

Example Processes of DL Transmission in Anchor Non-Relocation Scenario

Figure 8:
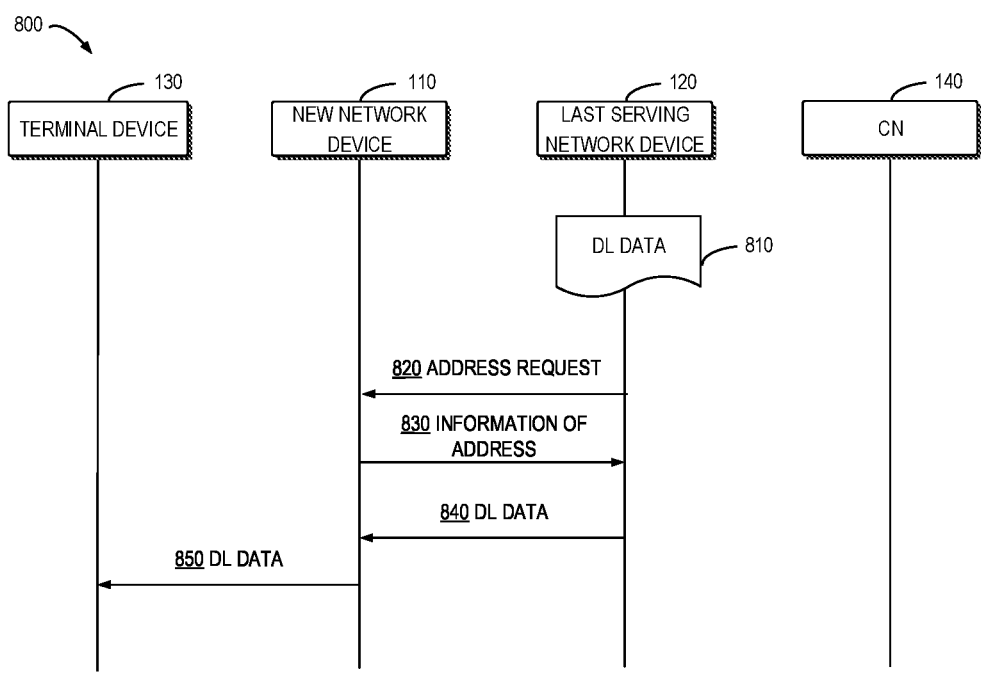
FIG. 8 is a signaling chart illustrating a processes of downlink transmission according to some embodiments of the present disclosure.

In the anchor non-relocation scenario, there may be DL information to be transmitted to the terminal device 130. FIG. 8 is a signaling chart illustrating a process 800 of DL transmission according to some embodiments of the present disclosure. In the process 800, the last serving network device 120 determine that DL data 810 is to be transmitted to the terminal device 130. Such DL data 810 may be forwarded by the new network device 110 to the terminal device 130.

In some embodiments, DL data 810 may be data provided by the destination of the UL data (for example, the UPF 144 in CN 140) to the last serving network device 120 for the terminal device 130 (for example, as a response to the transmission of the UL data). In some embodiments where the UL data is transmitted in a RLC PDU from the new network device 110 using the MAC entity 522 (as in the example of FIG. 5), the last serving network device 120 may transmit a status report for a RLC PDU comprising the UL data. Such status report may be transmitted as a RLC PDU and is regarded as DL data 810.

The transmission of DL data may be performed via a user plane interface. Thus, the last serving network device 120 may need a data forwarding address of the new network device 110. The last serving network device 120 transmits 820 an address request to the new network device 110 to request for the data forwarding address of the new network device 110. As an example, the last serving network device 120 may transmit, via the Xn-C interface, an Xn-U ADDRESS REQUEST message to the new network device

110 to request for the data forwarding address for DL transmission. The new network device 110 responds 830 with information on the data forwarding address, for example, in the Xn-U ADDRESS INDICATION message. In some embodiments, the new network device 110 may include its data forwarding address in a message sent to the last serving network device 120 without being requested. For example, the information on the data forwarding address may be included in a RETRIEVE UE CONTEXT REQUEST message sent to the last serving network device 120 in some embodiments where the last serving network device 120 makes a decision on whether or not to perform anchor relocation. As another example, the information on the data forwarding address may be included in an Xn-U ADDRESS REQUEST message sent to the last serving network device 120 when the new network device 110 requests for the data forwarding address of the last serving network device 120. Of course, the information on the forwarding address may be transmitted in any other message to the last serving network device 120.

The last serving network device 120 then transmits 840 the DL data to the new network device 110 based on the data forwarding address, for example, via a user plane interface between the last serving network device 120 and the new network device 110. The new network device 110 forwards 850 the DL data to the terminal device 130.

In some embodiments, in addition to the DL data, the last serving network device 120 may provide DL control information for the new network device 110 to cause the network device 110 to forward to the terminal device 130. In some embodiments, the DL control information may include control information to set the terminal device 130 to the normal inactive state.

Figure 9:
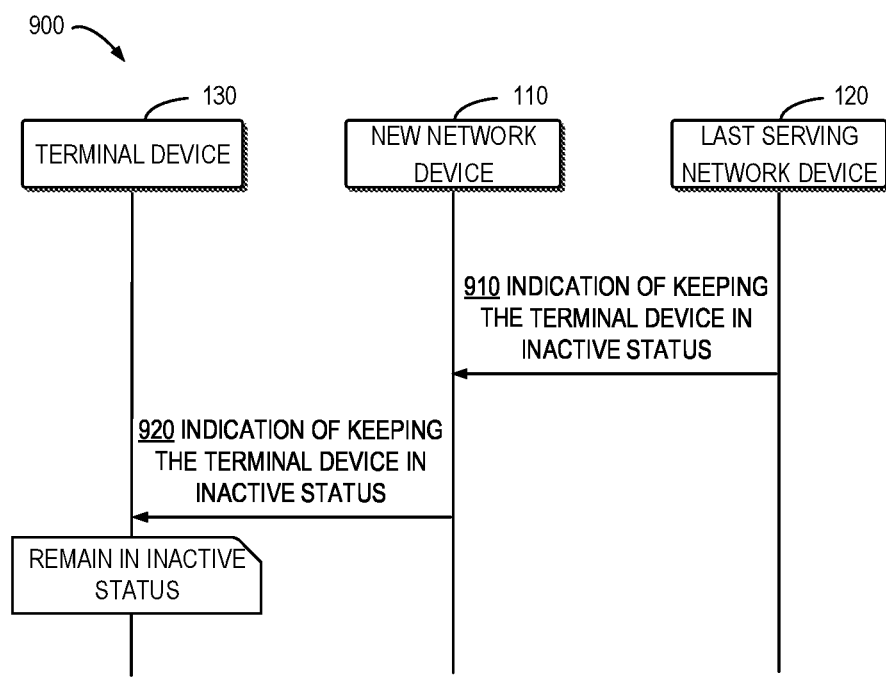
FIG. 9 is a signaling chart illustrating a processes of downlink transmission according to some other embodiments of the present disclosure.

FIG. 9 is a signaling chart illustrating a process 800 of DL transmission according to some other embodiments of the present disclosure. In the process 900, the last serving network device 120. In the case of anchor non-relocation, the last serving network device 120 transmits 910 an indication (sometimes referred to as a second indication) of keeping the terminal device 130 in the inactive state to the terminal device 130 via the new network device 110.

In some embodiments, in case of without UE context relocation, the last serving network device sends a control message which includes a RRCRelease message encapsulated in a PDU (such as a RLC-C PDU or a PDCP-C PDU). The control message can be a RRC TRANSFER message. The new network device 110 transmits 920 the indication of keeping the terminal device 130 in the inactive state to the terminal device 130 such that the terminal device 130 remains in the inactive state. The new network device 110 may extract the RRCRelease message encapsulated in the PDU received from the last serving network device which may indicate to the terminal device 130 to stay in inactive.

It would be appreciated that in addition to the indication of keeping the terminal device in inactive or as some alternatives, other types of control information may also be transmitted from the last serving network device 120, forwarded by the new network device 110, and to the terminal device 130. In some embodiments, the DL data and the DL control information may be transmitted together in a message. The scope of the present disclosure is not limited in these regards.

Example Device

Figure 10:
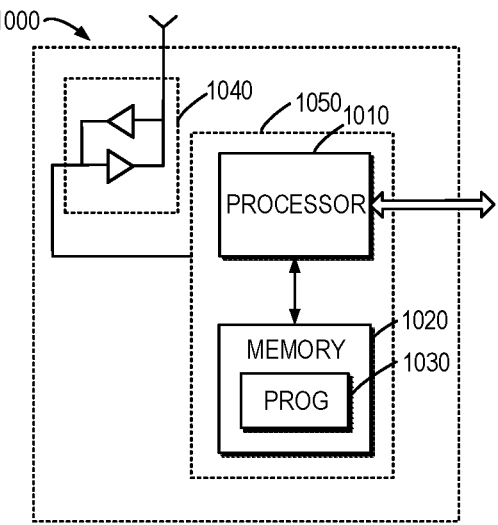
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the terminal device 130, the network device 120, or the network device 110 as shown in FIG. 1. Accordingly, the device 1000 can be implemented at or as at least a part of the terminal device 130, the network device 120, or the network device 110.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1020 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 2 to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first network device, the method comprising:

receiving, from a second network device, a RETRIEVE UE CONTEXT REQUEST message regarding Small Data Transmission (SDT) of a User Equipment (UE) in an inactive state, wherein the RETRIEVE UE CONTEXT REQUEST message comprises first information indicating a quantitative value of uplink (UL) data of the SDT;

determining relocation of a context of the UE, based on the RETRIEVE UE CONTEXT REQUEST message comprising the first information; and transmitting, based on a determination not to relocate the context of the UE, User Plane (UP) Transport Layer information to the second network device, the UP Transport Layer information indicating an address for the UL data of the SDT associated with a user plane interface.

2. The method of claim 1, further comprising:
delivering the UL data of the SDT to a core network.

3. The method of claim 1, wherein the address is a destination address of the first network device.

4. The method of claim 1, further comprising:
receiving a control message containing UL data of the SDT from the second network device, after transmitting the UP Transport Layer information to the second network device.

5. The method of claim 1, wherein a Radio Link Control (RLC) entity related to the SDT is established at the second network device, and a Packet Data Convergence Protocol (PDCP) entity is kept at the first network device.

6. The method of claim 1, wherein the UL data of the SDT is received in a form of Packet Data Convergence Protocol (PDCP) Protocol Data Unit (PDU).

7. The method of claim 1, further comprising:
receiving, from the second network device, second information indicating an address for downlink (DL) data of the SDT on the user plane interface between the second network device and the first network device.

8. The method of claim 7, further comprising:
receiving the DL data of the SDT from a core network; and
transferring the DL data of the SDT to the second network device.

9. The method of claim 7, further comprising:
transmitting a Radio Resource Control (RRC) transfer message containing DL control data of the SDT to the second network device.

10. The method of claim 1, further comprising:
transmitting, to the second network device, a message including a Radio Resource Control (RRC) Release message encapsulated therein, wherein the RRC Release message includes indication for the UE to be in the inactive state.

11. The method of claim 1, wherein the user plane interface is an Xn interface between the first network device and the second network device.

12. A method performed by a User Equipment (UE), the method comprising:

transmitting, to a second network device, uplink (UL) data of Small Data Transmission (SDT), while remaining in an inactive state, wherein a RETRIEVE UE CONTEXT REQUEST message regarding the SDT is transmitted from the second network device to a first network device based on the transmitting of the UL data of the SDT, wherein the RETRIEVE UE CONTEXT REQUEST message comprises first information indicating a quantitative value of uplink (UL) data of the SDT, wherein the RETRIEVE UE CONTEXT REQUEST message comprising the first information is used by the first network device to determine relocation of a context of the UE, and wherein User Plane (UP) Transport Layer information indicating an address for the UL data of the SDT associated with a user plane interface is transmitted from the first network device to the second network device based on a determination not to relocate the context of the UE to the second network device.

13. The method of claim 12, further comprising:
receiving, from the second network device, a Radio Resource Control (RRC) Release message, wherein,
the RRC Release message includes indication for the UE to be in the inactive state, and
a message including the RRC Release message encapsulated therein, is transmitted from the first network device to the second network device.

14. The method of claim 12, wherein the user plane interface is an Xn interface between the first network device and the second network device.

15. A first network device comprising:
a memory configured to store instructions; and
a processor configured to execute the instructions to:

receive, from a second network device, a RETRIEVE UE CONTEXT REQUEST message regarding of Small Data Transmission (SDT) of a User Equipment (UE) in an inactive state, wherein the RETRIEVE UE CONTEXT REQUEST message comprises first information indicating a quantitative value of uplink (UL) data of the SDT;

determine relocation of a context of the UE, based on the RETRIEVE UE CONTEXT REQUEST message comprising the first information; and transmit, based on a determination not to relocate the context of the UE, User Plane (UP) Transport Layer information to the second network device, the UP Transport Layer information indicating an address for the UL data of the SDT associated with a Xn user plane interface.

16. The first network device of claim 15, wherein the processor is further configured to execute the instructions to: deliver the UL data of the SDT to a core network.

17. The first network device of claim 15, wherein the address is a destination address of the second network device.

18. The first network device of claim 15, wherein the processor is further configured to execute the instructions to:

receive a control message containing UL data of the SDT from the second network device, after transmitting the UP Transport Layer information to the second network device.

* * * * *